(12) United States Patent
Lenz et al.

(10) Patent No.: US 8,738,244 B2
(45) Date of Patent: May 27, 2014

(54) AGRICULTURAL MACHINE HAVING A SYSTEM FOR AUTOMATIC SETTING OF A WORKING PARAMETER, AND ASSOCIATED METHOD

(71) Applicant: Deere & Company, Moline, IL (US)

(72) Inventors: James E. Lenz, Urbana, IL (US); Ole Peters, Enkenbach-Alsenborn (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/754,040

(22) Filed: Jan. 30, 2013

(65) Prior Publication Data

US 2013/0197767 A1    Aug. 1, 2013

(30) Foreign Application Priority Data

Jan. 31, 2012    (DE) .................. 10 2012 201 333

(51) Int. Cl.
    *G06F 19/00*      (2011.01)
    *A01B 79/00*      (2006.01)
    *A01C 21/00*      (2006.01)
    *A01C 23/00*      (2006.01)

(52) U.S. Cl.
     CPC .................. *A01B 79/00* (2013.01); *A01C 21/00* (2013.01); *A01B 79/005* (2013.01); *A01C 23/00* (2013.01)
     USPC .................. 701/50; 701/23; 701/41; 701/408; 701/466; 701/468; 340/468; 340/815.69; 340/988; 700/243; 455/419

(58) Field of Classification Search
     CPC .... A01B 79/005; A01B 69/008; A01B 49/06; A01B 63/00; A01B 15/20; A01B 69/007; A01B 79/00; A01B 49/027; A01B 61/046; A47J 37/1228; Y10S 111/903; Y10S 111/90; Y10S 715/965; Y10S 111/904; Y10S 111/921; Y10S 111/922; A01C 7/105; A01C 21/007; A01C 15/00; A01C 17/00; A01C 7/06; A01C 21/00; A01C 21/002; A01D 43/14
     USPC .............. 701/23, 50, 468, 41, 466, 408, 448, 701/472, 303.8, 31.4, 412, 58; 340/684, 340/815.69, 988; 700/243; 702/5; 280/400; 455/419; 74/528
     See application file for complete search history.

(56) References Cited

U.S. PATENT DOCUMENTS

| | | | |
|---|---|---|---|
| 5,931,882 | A | 8/1999 | Fick et al. |
| 6,070,539 | A | 6/2000 | Flamme et al. |

(Continued)

FOREIGN PATENT DOCUMENTS

| | | |
|---|---|---|
| DE | 4016603 A1 | 11/1991 |
| DE | 4431824 C1 | 5/1996 |

(Continued)

*Primary Examiner* — McDieunel Marc
(74) *Attorney, Agent, or Firm* — Yee & Associates, P.C.

(57) ABSTRACT

An agricultural machine comprises an electronic control device, an actuator, which is actuated under external power, for adjustment of at least one working parameter of the agricultural machine, and a sensor, which is connected to the control device, for detection of the vertical position of the agricultural machine. It is proposed that the control device can be operated so as to derive from the signals of the sensor which topographical zone of a number of topographical zones of a field the agricultural machine is situated in each case, and to activate the actuator as a function of the respective topographical zone.

13 Claims, 4 Drawing Sheets

(56) References Cited

U.S. PATENT DOCUMENTS

| | | | |
|---|---|---|---|
| 6,070,673 A * | 6/2000 | Wendte | 172/2 |
| 6,522,948 B1 * | 2/2003 | Benneweis | 700/243 |
| 6,810,315 B2 * | 10/2004 | Cessac | 701/50 |
| 7,184,892 B1 * | 2/2007 | Dyer et al. | 702/5 |
| 8,260,499 B2 * | 9/2012 | Boydell | 701/42 |
| 8,594,879 B2 * | 11/2013 | Roberge et al. | 701/23 |
| 2008/0177449 A1 * | 7/2008 | Pickett et al. | 701/50 |
| 2010/0249998 A1 | 9/2010 | Holland | |
| 2012/0174445 A1 * | 7/2012 | Jones et al. | 37/197 |

FOREIGN PATENT DOCUMENTS

| | | |
|---|---|---|
| DE | 10133191 A1 | 1/2003 |
| DE | 102007049652 A1 | 4/2009 |
| EP | 0282639 A2 | 9/1988 |
| EP | 0970595 A1 | 1/2000 |
| EP | 0992186 A1 | 4/2000 |
| EP | 2524586 A2 | 11/2012 |
| GB | 2318652 A | 4/1998 |

\* cited by examiner

AGRICULTURAL MACHINE HAVING A SYSTEM FOR AUTOMATIC SETTING OF A WORKING PARAMETER, AND ASSOCIATED METHOD

The invention relates to an agricultural machine having a system for automatic setting of a working parameter, comprising: an electronic control device; an actuator, which is controlled by the control device and actuated under external power, for adjustment of at least one working parameter of the agricultural machine; and a sensor, connected to the control device, for detection of the vertical position of the agricultural machine and/or the inclination of the agricultural machine in the forward direction and/or in the sideward direction and/or the distance between the agricultural machine and an object, and to a corresponding method.

BACKGROUND

During agricultural work, in many cases, the most suitable setting of an agricultural working machine from economical and ecological aspects is dependent on properties of the location of a field respectively being worked upon. In this regard, reference is made in particular to the topographical position of the respective location, which has a resulting influence on the supply of water, light and nutrients to the crops. For example, sunken areas of a field are normally supplied more abundantly with water than elevated areas. Owing to the more abundant water supply, more (and larger) crops grow in the sunken areas than on the elevated areas, which crops can thus be sown more densely in the sunken areas than on the elevated areas. Analogously, it is also the case that more fertilizer is required in the sunken areas than on the elevated areas. The different crop densities also have the effect that, during harvesting, different settings of the harvesting machine are expedient, because for example in the case of a combine harvester, the threshing gaps and screen openings can be selected to be larger in the case of greater material throughputs owing to greater crop densities than in the case of small material throughputs (and/or the harvesting speed can be selected to be higher in the case of low crop densities than in the case of higher crop densities). Aside from the described topography of the field, the soil type also has an influence on the setting of the agricultural working machine because, for example, fewer and smaller crops grow on light sandy soils than on heavy marshy soils. Further influential variables are the proximity to trees providing shade, or to water holes or springs.

In the prior art, this long-known problem of the location-specific setting of working machines is solved by means of setpoint value maps in which data regarding the working machine parameters to be set are stored in georeferenced form. During working, said data are accessed on the basis of the respective position of the working machine, which is detected by means of a satellite-based position determining system such as GPS (cf. DE 101 33 191 A1 for soil working or DE 44 31 824 C1 for harvesting machines), or the area to be cultivated is reproduced in linear form on a storage medium, and during the working of the field, the associated data are accessed in a travel-dependent manner for location-specific activation of the working machine (EP 0 282 639 A2).

EP 0 992 186 A1 describes a method for the cultivation of perennial crops such as grapevines and fruit trees, in which method a three-dimensional map of the field with the locations of the individual crops and the yield thereof is generated and is used for planning of subsequent measures.

On the other hand, it has been proposed that local sensors for detection of the nutrient supply and the other soil properties of the soil to be cultivated be provided on board an agricultural machine, and used for the automatic determination of the respective discharge quantities of seed and fertilizer (DE 40 16 603 A1).

In the case of soil working, it has also been proposed (GB 2 318 652 A) that the towing forces to be imparted for towing a plough be detected in order to measure the soil density and to utilize the latter for the automatic control of the working width of the plough, the engine speed and the forward speed of the tractor.

The previous approaches for the automation of the location-specific control of agricultural working machines accordingly involve either local sensors for detection of soil properties (DE 40 16 603 A1 or GB 2 318 652 A), for which purpose relatively complex and expensive sensors must be provided in order to obtain adequate accuracy in the discharging of the materials and the desired crop production results, or setpoint value maps and position determining systems (EP 0 282 639 A2, DE 101 33 191 A1, DE 44 31 824 C1, EP 0 992 186 A1). The map-based systems are afflicted with the outlay for the creation of a setpoint value map and high costs for a sufficiently accurate position determining system, as a result of which presently only a relatively small proportion of agricultural machines are fitted with such map-based control.

SUMMARY OF THE INVENTION

The problem on which the present invention is based is considered to be that of providing a system and a method for automatic setting of working parameters of an agricultural machine, which do not have, or have only to a small extent, the disadvantages mentioned.

Said problem is solved according to the invention by means of the teaching of patent claims 1 and 12, wherein the further patent claims specify features which refine the solution in an advantageous manner.

An agricultural machine is equipped with a system for automatic setting of a working parameter, and for this purpose has an electronic control device, an actuator, which is controlled by the control device and actuated under external power, for adjustment of at least one working parameter of the agricultural machine, and a sensor, which is connected to the control device, for detection of the vertical position of the agricultural machine and/or the inclination of the agricultural machine in the forward direction and/or in the sideward direction and/or the distance between the agricultural machine and an object. During operation, the control device derives from the signals of the sensor which topographical zone of a number of topographical zones of a field the agricultural machine is situated in each case, and activates the actuator as a function of the respective present topographical zone in which the agricultural machine is presently situated.

The agricultural machine thus comprises a sensor, on the basis of the signals of which the control device determines which topographical zone of a field the agricultural machine is presently situated. As the agricultural machine travels, the control unit controls the actuator—online—on the basis of the respective sensor-detected topographical zone. The provision of complex sensors for detection of crop or soil properties, and the creation of setpoint value maps, are thus also made superfluous. The machine according to the invention accordingly permits working adapted to the respective location of the field with little outlay and in an inexpensive manner.

The sensor may be for example an air pressure sensor, from the signals of which the height of the agricultural machine above sea level or any desired other reference level can be derived. The vertical position of the machine may alternatively or additionally be detected by means of a satellite-based positioning determining system which generally need not exhibit particularly high precision, and which is thus available at relatively low cost. The topographical zone of the field may alternatively or additionally also be determined by means of a sensor for detection of the inclination of the agricultural machine in the forward direction additionally using the signals from a travel, speed or acceleration sensor for detection of the distance covered by the agricultural machine or of the speed or acceleration of the latter, because the integral over the sine of the angle of inclination along the distance covered by the agricultural machine represents a change in height of the agricultural machine. In this way, it is accordingly determined by sensors what absolute or relative height of the field the agricultural machine is presently situated at. Since, from experience, the soil and the crops growing thereon also have different properties at different heights of the field, the field is divided into topographical height zones. The activation of the actuator for the control of at least one working parameter of the agricultural machine then takes place on the basis of the respectively determined topographical zone of the field, which is a height zone.

It is however also conceivable for the field to be divided into topographical zones additionally or exclusively on the basis of the inclination of the agricultural machine (and thus of the respective part of the field), and for said zones to be detected by sensors, for which purpose use may be made of inclination sensors for detection of the inclination of the agricultural machine in the forward direction and/or in the sideward direction. In this way, different topographical inclination zones of the field can be determined. Since the inclination also has an influence on water supply and the solar irradiation and thus on the crop cultivation, the working parameter of the agricultural machine may also (alternatively or in addition to the activation based on the topographical height zone) be based on the respective topographical inclination zone.

Furthermore, the distance to an object may be detected by the sensor. Said object may be for example a tree or a water hole or a spring or any other geographical feature which has an influence on the crop cultivation. The distance between the object and the agricultural machine may be detected for example by means of a camera which records two-dimensional images, a PMD or stereo camera or a laser scanner. The field is then divided analogously into distance zones, and the working parameter of the agricultural machine is (alternatively or in addition to the activation based on the topographical inclination and/or height zone) based on the respective topographical distance zone.

In a preferred embodiment of the invention, during a learning phase, the control device firstly learns and stores the relationships between operator inputs, affected by means of an input device, regarding the control of the actuator and the respective topographical zone. In a subsequent usage phase, the control device then controls the actuator on the basis of the respective topographical zone and the associated learned operator input which was stored in a memory.

In the usage phase, the operator can modify the operating parameters of the actuator through corresponding inputs into an input device, whereupon the control device also updates the stored, learned operator inputs and henceforth uses said updated inputs. During later work on the same field, the learning phase may then be omitted, and the actuator operating parameters accessed in the memory may be used directly, as a function of the respective topographical zone. In another embodiment, it would however also be possible for the actuator operating parameters not to be learned but rather to be predefined, wherein for example a preliminary plan generated by means of a farm computer may be used.

The number and/or sizes of the topographical zones are fixedly predefined in the control device and/or may be capable of being input by the operator. Alternatively, these may be set automatically by the control device on the basis of the signals of the sensor and/or the operator inputs. In one possible embodiment, it would accordingly be possible for the number of topographical zones to be set to a fixedly predefined number, or a number that can be input by the operator, of three (or some other number n) topographical zones, and the boundaries thereof are set on the basis of the signals of the sensor in each case between the three (or n) resulting thirds (or n-ths). It would also be possible for the number to be variable, and the boundaries between the topographical zones are set on the basis of the signals of the sensor in accordance with predefined changes, or changes that can be input by the operator, of the sensor signals, such as for example every 10 meters in height or 2 degrees in inclination. Furthermore, it is possible on the basis of changing operating inputs to identify where a boundary between the topographical zones should lie in the view of the operator. Accordingly, if the operator changes an operating parameter of the actuator, a boundary between two topographical zones is generally present, such that the control device automatically registers the end of the preceding topographical zone and the start of a new topographical zone at this location, and assigns the user inputs to the respective zones.

It would be conceivable for the control device to additionally be connected to a soil properties sensor for detection of soil properties. Such a soil properties sensor may for example detect the towing force of a soil working implement. The control device controls the actuator (in addition to the control as a function of the respective topographical zone) on the basis of the signals of the soil properties sensor. It is also possible for a crop properties sensor to detect any desired properties, for example crop density, height, color, reflective properties in the infrared range, of the crops on the field, the signals of which crop properties sensor (in addition to the control as a function of the respective topographical zone) can be used by the control device for the control of the actuator.

A usage example for the present invention is a tractor with a working implement mounted thereon or towed thereby. The actuator controls the forward speed of the tractor and/or (by means of a change of the engine rotational speed and/or the transmission ratio of the power takeoff shaft gearing) the rotational speed of a power takeoff shaft, in order to adjust the working speed of working elements of the working implement, and/or the vertical position of an adjustable clutch to which the working implement is fastened, in order to adjust the working depth of working elements of the working implement.

A further exemplary embodiment would be a soil working machine in which the actuator controls the working depth of the soil working tools.

The invention may also be utilized on a spreading machine for discharging materials such as seeds, fertilizer, herbicides or pesticides, in particular in the form of a sowing machine, agricultural sprayer or dung or fertilizer spreader, wherein the actuator controls the discharge quantity per unit area. In the case of a sowing machine, the actuator can set the sowing depth and/or the distances between the seeds in the forward direction and/or in the sideward direction.

Finally, the agricultural machine may be a combine harvester, and the actuator may control the cut height and/or the reel height of a front-mounted harvesting attachment and/or the rotational speed of a cleaning fan and/or the opening size of a cleaning screen and/or the advancing speed of the combine harvester.

EXEMPLARY EMBODIMENT

Two exemplary embodiments of the invention which are described in more detail below are illustrated in the drawings, in which.

Figure 1:
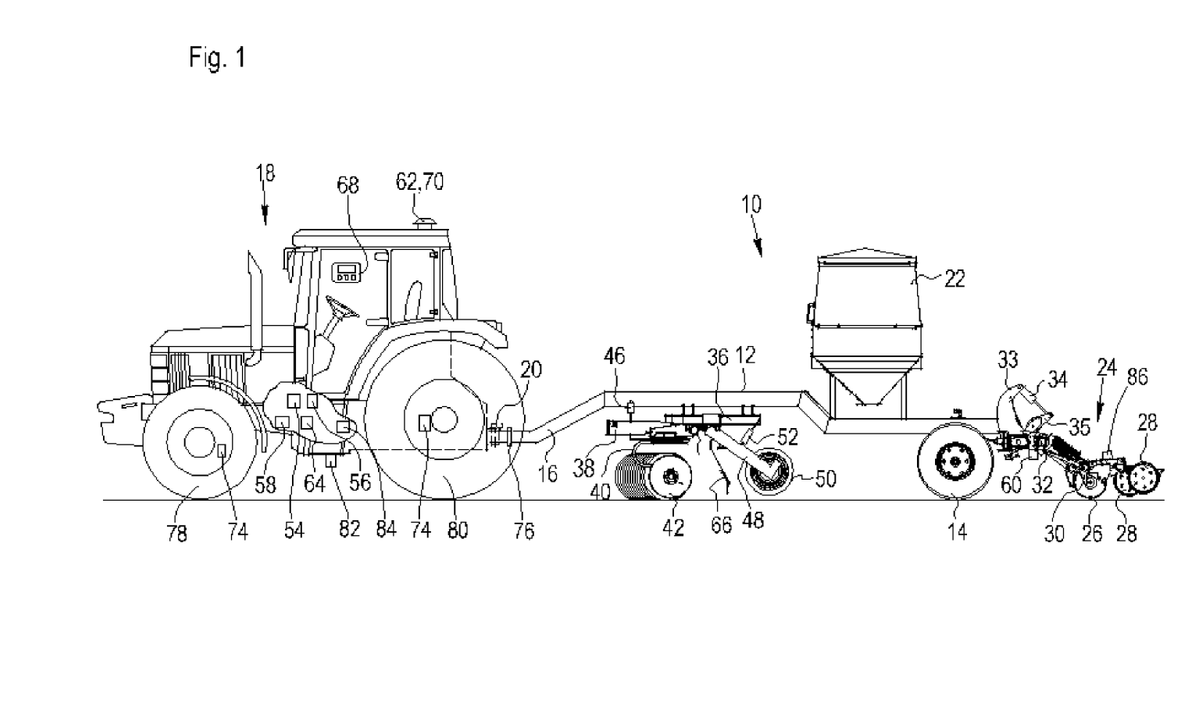
FIG. 1 shows a side view of an agricultural machine in the form of a tractor with a towed combination cultivator.

FIG. 1 shows an agricultural machine in the form of a tractor 18 with a combination cultivator 10 towed by the tractor 18. The combination cultivator comprises a frame 12 which extends in the forward direction, running from right to left in the drawing, and which is supported on the ground by means of a running gear which comprises wheels 14. At its front end, the frame 12 is coupled to the tractor 18 by means of a towing bar 18 via a releasable coupling 20.

The frame 12 bears, in front of the wheels 14, a seed container 22 for holding seeds. By means of measurement systems not illustrated in the drawing, the seed is metered from the seed container 22 and supplied via seed lines to sowing devices 24 arranged at the rear side of the frame 12, which sowing devices comprise a furrow opener 26 in the form of a disc, sowing shears 30 which discharge the seeds into the furrow generated by the furrow opener 26, and closing wheels 28 for subsequently closing the furrow.

A plurality of sowing devices 24 are supported laterally adjacent to one another on a tool carrier 32 which is supported on the frame 12 and which extends transversely with respect to the forward direction. The sowing devices 24 are mounted so as to be pivotable about an axis running parallel to the longitudinal axis of the tool carrier 32. The pivot angle of all of the sowing devices 24, and thus the sowing depth, is set by an actuator 34 in the form of a hydraulic cylinder, which extends between a bracket 33 connected to the frame 12 and an arm 35 coupled to the sowing devices 24.

In front of the seed container 22, a carrier frame 36 is fastened below the frame 12. The carrier frame 36 holds a pivot frame 38 which is pivotable about a horizontal pivot axis 44 running transversely with respect to the forward direction, on which pivot frame a soil working tool 42 in the form of a disc harrow is supported via a U-shaped spring 40. An actuator 46 which is arranged between the frame 12 and the pivot frame 38 and which is in the form of a hydraulic cylinder defines the pivot angle of the pivot frame 38 about the pivot axis 44. The actuator 46 can be operated with an adjustable pressure, and in this way controls the pressure with which the soil working tool 42 acts on the ground. Any desired other soil working tool 42 may be used instead of the disc harrow.

Behind the soil working tool 42, as viewed in the forward direction, there is furthermore articulatedly connected to the carrier frame 36 a bracket 48 which is pivotable about an axis running parallel to the pivot axis 44, on the lower end of which bracket there is mounted a soil roller 50 in the form of a tyre packer. An actuator 52 in the form of a hydraulic cylinder which extends between the carrier frame 36 and the bracket 48 defines the pivot angle of the bracket 48. The actuator 52 can be acted on with an adjustable pressure and in this way controls the pressure with which the soil roller 42 acts on the ground. Instead of a tyre packer, use could be made of any desired type of roller, for example oblique bar packer rollers, tubular bar packer rollers, disc packer rollers, toothed packer rollers, spiral packer rollers and prismatic rollers. The soil roller 50 could also be in the form of a front tyre packer or support roller, that is to say bear part of the weight of the combination cultivator and serve for depth control, wherein the wheels 14 would have to be lifted during working. Aside from the illustrated rigid fastening of the soil roller 50 to the bracket 48, the interposition of a spring would also be conceivable. It would also be possible for each individual wheel of the soil roller 50 to be controlled by means of an actuator 52 assigned thereto.

At both lateral ends of the soil working tool 42 there are arranged U-shaped springs 40 which are connected to the pivot frame 38. Brackets 48 are also arranged, and connected to the carrier frame 36, at both lateral ends of the soil roller 50. The soil working tool 42 and the soil roller 50 may be composed of three or more portions arranged laterally adjacent to one another, the outer ones of which may, in a manner known per se, be pivoted up for road transport. Corresponding drives in the form of hydraulic cylinders must be provided for this purpose. Between the soil working tool 42 and the soil roller 50 there is arranged a comb 66 which is connected to the carrier frame 36. Accordingly, the combination cultivator 10 is a combination of firstly a sowing machine with the seed container 22 and the sowing devices 24 and secondly a soil working implement with the soil working tool 42, the comb 66 and the soil roller 50.

The tractor 18 is equipped with a control device 54 set up to charge the actuators 34, 46 and 52 with, or discharge from the actuators, hydraulic fluid from a source 58 of pressurized hydraulic fluid via lines (not illustrated in the drawing) by means of a valve device 56 which preferably comprises proportional valves. In the embodiment illustrated, the actuators 34, 46 and 52 are of double-acting design in order to be able to lift the working elements of the combination cultivator 10 on the headland or when travelling on a road. The use of single-acting hydraulic cylinders would however also be conceivable. The control device 54 is therefore set up to predefine the pressure of the actuators 46 and 52. Information regarding the position of the actuator 34 is supplied to the control device 54 by means of a sensor 60, such that the sowing depth of the sowing devices 24 can be regulated by the control device 54 by means of the valve device 56.

The valve device 56 may be situated on board the tractor 18, as shown in FIG. 1, or on board the combination cultivator 18. In the second case, said valve device would be connected to the control device 54 via a bus system, for example an ISO bus, which also produces the connection between the control device 54 and the actuator 86 and the sensor 60. Furthermore, it would also be possible for the control device 54 to be arranged on board the combination cultivator 10, and for only the operator input device 68 to be positioned, as a virtual terminal, on board the tractor 18 and connected via a bus system to the control device 54 (and if appropriate to a further control device, which controls the actuator 84 and the valve device 56, of the tractor 18).

Signals containing information regarding the respective position (including the height above sea level) of the tractor vehicle 54 are supplied to the control device 54 by a position determining system 62 with a satellite receiver antenna which is designed for receiving GPS (Global Positioning System) signals. Furthermore, there is provided on board the tractor 18 an inclination sensor 70 which detects the sideward inclination (roll angle) and the inclination in the forward direction (pitch angle) of the tractor 18 and which may preferably but not imperatively be installed jointly in the housing of the position determining system 62. The angles of inclination may be sensed for example by means of acceleration sensors or by means of pendulums, the angle of which is detected, and are supplied to the control device 54. A speed sensor 74 detects the rotational speed of a front wheel 78 or rear wheel 80 of the tractor 18 and conducts the signals thereof likewise to the control device 54. The speed of the tractor 18 above sea level may also be detected by means of a radar sensor 82.

An actuator 84 in the form of a speed setting device is connected to the control device 54 and serves for setting the forward speed of the tractor 18 by adjusting the rotational speed of the drive engine of the tractor 18 and/or the gearbox transmission ratio between the drive engine and the drivable wheels 78 and/or 80. An actuator 86 sets the distance interval at which the sowing devices 24 deposit seeds in the ground. The actuator 86 may serve for example for driving the measurement systems of the sowing device 24 or for changing the rotational speed thereof.

Figure 2:
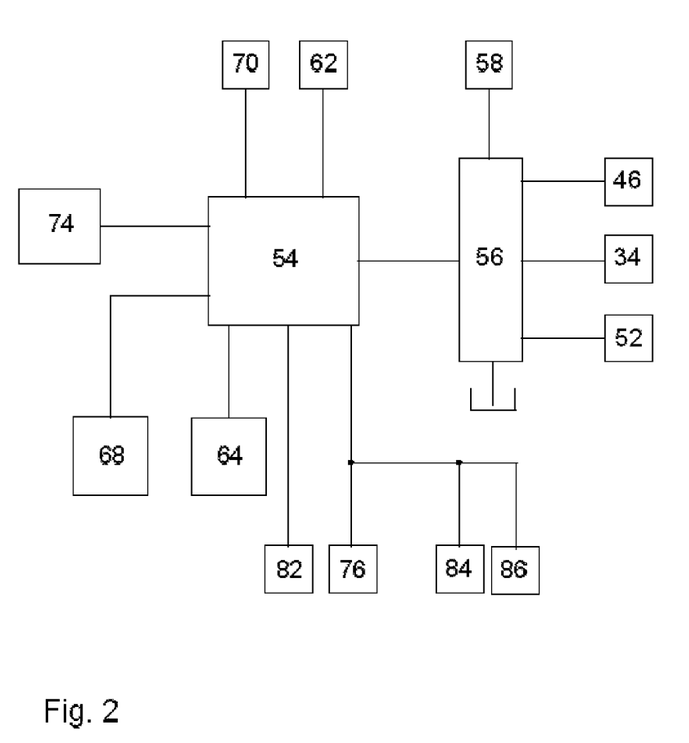
FIG. 2 shows a diagram of a control device with the connected components for the control of the actuators of the combination cultivator.

Finally, at the operator's position in the tractor 18, there is also provided an operator input device 68 which is likewise connected to the control device 54. The control device 54 and the components connected thereto, including a memory device 64, are illustrated schematically in FIG. 2.

Figure 3:
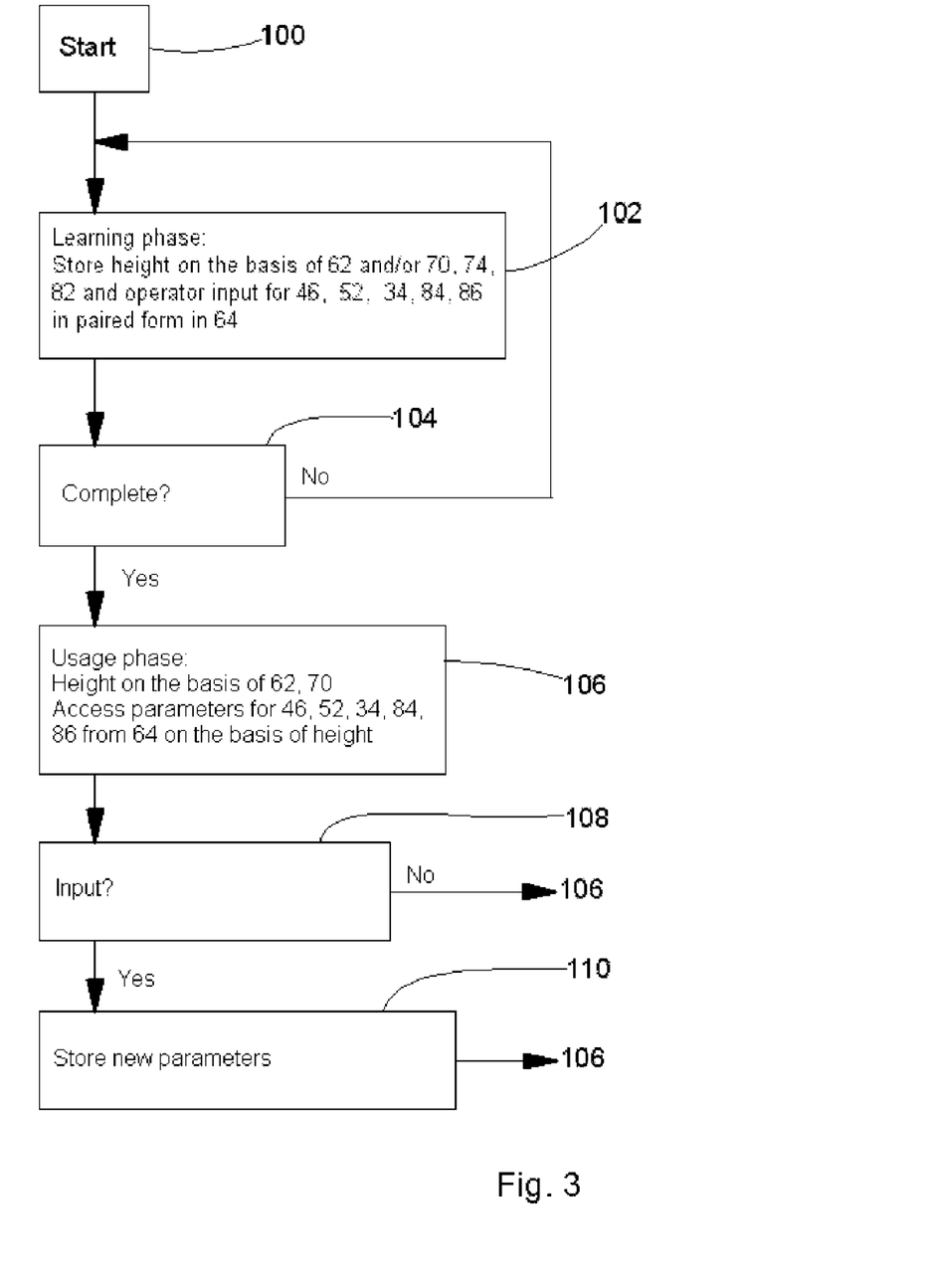
FIG. 3 shows a flow diagram by which the control device operates.

During operation, the control device 54 works in accordance with the flow diagram of FIG. 3. After the start in step 100, a learning phase (step 102) is firstly carried out in which the control device 54 determines the present height of the tractor 18 above sea level on the basis of the position signals of the position determining system 62 and/or a relative change in height relative to a starting position upon the commencement of work, or when a predefined reference position is reached, on the basis of the signals of the inclination sensor 70 with regard to the inclination in the forward direction and the signals of one or more of the speed sensors 74 and/or of the radar sensor 82. During field working, the operator at his operator's position specifies, by means of the operator input device 68 (or other suitable input means), settings for the pressure in the actuator 46, which determines the ground pressure or the working depth of the soil working tool 42, for the pressure of the actuator 52, which determines the ground pressure of the soil roller 50, for the pressure or the position of the actuator 34, which determines the sowing depth of the sowing devices 24, for the advancing speed of the tractor 18, which is controlled by means of the actuator 84, and by means of the density of the discharged seed, which is controlled by means of the actuator 86. The height or change in height and the associated parameters of the actuators 46, 52, 34, 84, 86 are stored in paired form in the memory device 64. Here, the setpoint values of the parameters input by the operator or the actual values of the parameters detected by means of suitable sensors (for example, 74 and/or 82 for the forward speed) may be used. Through suitable programming of the control unit 54, it is possible, in order to improve accuracy, to make allowance for the offset between the sensors 62, 70 and those components of the combination cultivator 18 which engage with the soil (that is to say soil working tool 42, soil roller 50 and sowing devices 24).

When the operator has traveled with the tractor 18 and the combination cultivator 10 over an adequately representative part of the field which covers as far as possible all height regions of the field, the operator can, in step 104, provide an input to the effect that the learning phase has ended. If this is not the case, said step 104 is followed by step 102 again; otherwise, said step 104 is followed by step 106.

At the time at which step 106 is reached, the memory device 64 contains information for all height regions of the field, and the associated parameters of the actuators 46, 52, 34, 84, 86. Here, the height regions may be divided into at least two ("low" and "high"), three ("low", "middle" and "high") or even more topographical zones. The number of zones used for a field could also be set by the operator by means of the operator input device 68 or be dependent on the maximum differences in height of the field, wherein a zone may correspond to a fixed height or a height that can be input by the operator by means of the operator input device 68 (for example 10 m). On relatively flat fields, then, two height zones would be sufficient; on fields with more highly elevated areas, use would be made of for example five height zones. In another embodiment, when there is a change in the operator input and at the same time a non-negligible change in the values of the sensor 62 and/or 70, the control device 54 assumes that a boundary between two topographical zones has been crossed, such that if appropriate a new topographical zone must be established if this has not yet previously been traveled through. The operator inputs are then assigned to the respective topographical zone. In this way, the field is divided into topographical zones on the basis of the values of the sensor 62 and/or 70 during travelling.

The parameters, determined in the respective topographic height zones, of the actuators 46, 52, 34, 84, 86 may expediently be averaged such that the amounts of data do not become too large and in order to be able to compensate for individual erroneous inputs. Respectively associated, generally different parameters are stored for the five actuators 46, 52, 34, 84, 86.

In step 106, the parameter to be set is then accessed from the memory device 64 on the basis of the respectively detected height and used for the automatic setting of the actuators 46, 52, 34, 84 and 86. In step 108, it is then queried whether the operator has overridden one or more of the present parameters of the actuators 46, 52, 34, 84 or 86 by means of the operator input device 68. If this is not the case, said step 108 is followed by step 106 again; otherwise, said step 108 is followed by step 110 in which the new parameter now input by the operator is stored in the memory device 64 and used for the activation of the actuators 46, 52, 34, 84, 86.

As a result of the height-dependent activation of the actuators 46, 52, 34, 84, 86, the control of the combination cultivator 18 is automated in a simple manner, and the most fundamental agronomic influential variables which must be given consideration for the setting of the combination cultivator (specifically whether a sunken area, an elevated area or an area in between is presently being worked upon), are taken into account. For example, the distance between the seeds may be selected, by means of the actuator 86, to be greater in dry elevated areas than in moist sunken areas. By means of another actuator (not shown), it would also be possible for individual sowing units 24 to be deactivated and activated in order to vary the row spacing transversely with respect to the forward direction. The forward speed may be selected to be greater on the elevated areas than in the sunken areas, in which, again, more intensive soil working than in the elevated areas may take place.

As a further refinement, it is also possible for consideration to be given to the inclination of the tractor 18 as detected by means of the inclination sensor 70, and for a distinction to be made in steps 102 and 106 between whether the part of the field presently being worked upon is horizontal or inclined. The towing force in the towing bar 16 may also be detected by means of a towing force sensor 76, and from this it is possible to infer the soil properties, which would likewise be given consideration in steps 102 and 106.

Figure 4:
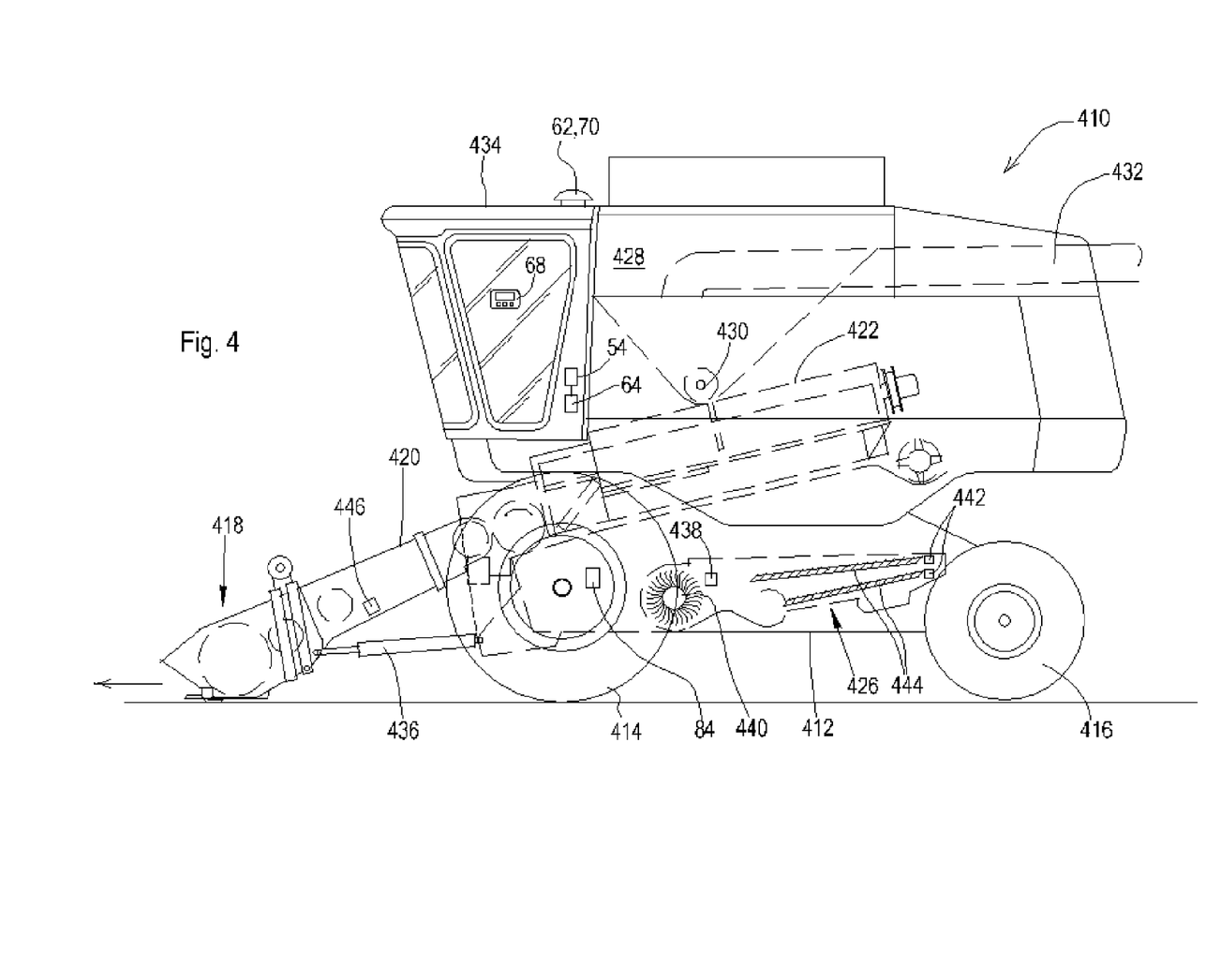
FIG. 4 shows a side view of an agricultural machine in the form of a combine harvester.

FIG. 4 shows a self-propelled harvesting machine in the form of a combine harvester 410, having a running gear 412 which is supported on the ground and propelled by means of driven front wheels 414 and steerable rear wheels 416. The wheels 414, 416 are set in rotation by drive means (not shown) in order to move the combine harvester 410 for example over a field to be harvested. Directions mentioned hereinafter, such as front and rear, relate to the direction of travel V of the combine harvester 410 during harvesting operation, which runs toward the left in FIG. 4.

To the front end region of the combine harvester 410 there is removably connected a front-mounted harvesting attachment 418 in the form of a cutting unit in order, during harvesting, to reap harvested crops in the form of grain or other threshable cereals from the field and supply them upward and rearward through an oblique conveyer assembly 420 to an axial threshing unit 422. The mixture containing grains and impurities which passes through threshing baskets and grates in the axial threshing unit 422 passes into a cleaning device 426. Cereal cleaned by the cleaning device 426 is supplied by means of a grain screw to an elevator, which conveys said cereal into a grain tank 428. The cleaned cereal from the grain tank 50 can be discharged through a discharge system with a transverse screw 430 and a discharge conveyer 432. Said systems are driven by means of a combustion engine and are controlled by an operator from a driver's cab 434.

A controller 54 controls (by means of valves which are not shown) the position of an actuator 436 for varying the height of the front-mounted harvesting attachment 418 above the ground, an actuator 438 for adjusting the rotational speed of a fan 440 of the cleaning arrangement 426, two actuators 442 for adjusting the opening width of screens 444 of the cleaning device 426, and an actuator 84 for setting the advancing speed of the combine harvester 410. A further actuator (not shown) controlled by the controller 54 could set the height of a reel of the front-mounted harvesting attachment 418.

The mode of operation of the controller 54 of the combine harvester 410 of FIG. 4 corresponds to the flow diagram of FIG. 3. In step 102, the operator sets the parameters for the actuators 84, 436, 438 and 442 by means of the operator input device 68, said parameters being stored together with the height (determined by means of the position determining system 62) and/or the change in height (determined by means of the inclination sensor 62) in the memory device 64 and being accessed, again in a manner dependent on height or change in height, in step 106. A crop sensor 446 which is positioned in the oblique conveyer 420 and which serves for detecting the amount of crop gathered may additionally be connected to the controller 54, and the signals of said crop sensor are also used in steps 102 and 106 (analogously to the towing force sensor 76 in the embodiment according to FIGS. 1 to 3).

In step 106 as per FIG. 3, the parameters of the actuators 84, 436, 438 and 442 are accessed from the memory device 64 as a function of the height or change in height of the combine harvester 410. In this way, the harvesting process is automatically adapted to the topographical zone in which the combine harvester 410 is presently situated. The throughput is thus lower in sparsely vegetated elevated areas than in more densely vegetated sunken areas, such that the advancing speed in the sunken areas will be lower than in the elevated areas. Analogously, the cut height will be greater in the sunken areas than in elevated areas, and the actuator 436 will move the cutting unit further upward than in elevated areas, in which only relatively small crops grow. The different throughputs which are dependent on the topographical height zone are also given consideration in the rotational speed of the fan 440 (actuator 438) and in the setting of the opening sizes of the screens 444 (actuator 442).

What is claimed is:

1. An agricultural machine having a system for automatic setting of a working parameter, comprising:
   an electronic control device;
   an actuator, which is controlled by the control device and actuated under external power, configured to adjust at least one working parameter of the agricultural machine; and
   a sensor, connected to the control device, that is configured to detect at least one of a vertical position of the agricultural machine, the inclination of the agricultural machine in a forward or sideward direction, and a distance between the agricultural machine and an object;
   wherein the control device is operable to derive from the signals of the sensor which topographical zone of a number of topographical zones of a field the agricultural machine is situated in, and to activate the actuator as a function of the respective topographical zone.

2. The agricultural machine according to claim 1, wherein the control device is configured to divide the field into topographic height and/or inclination zones and/or distance zones with regard to the distance between the agricultural machine and the object.

3. The agricultural machine according to claim 1, wherein the control device is configured such that, during a learning phase, it firstly learns and stores the relationships between operator inputs regarding the control of the actuator and the respective topographical zone, and subsequently, in a usage phase, it controls the actuator on the basis of the respective topographical zone and the associated stored operator input.

4. The agricultural machine according to claim 3, wherein the control device is configured such that, in the usage phase, it receives via an input device operator inputs regarding the change of operating parameters of the actuator, and it updates the stored, learned operator inputs in accordance with said inputs and henceforth uses said updated inputs for the control of the actuator.

5. The agricultural machine according to claim 3, wherein the number and/or sizes of the topographical zones are fixedly predefined in the control device and/or can be input by the operator and/or can be set automatically by the control device on the basis of the signals of the sensor and/or the operator inputs.

6. The agricultural machine according to claim 1, wherein the control device is connected to a soil properties sensor that is configured to detect of soil properties and/or to a crop properties sensor that is configured to detect crop properties, and is operable to control the actuator additionally on the basis of the signals of the soil properties sensor and/or of the crop properties sensor.

7. The agricultural machine according to claim 1, wherein the sensor comprises an air pressure sensor and/or a satellite-based position determining system.

8. The agricultural machine according to claim 1, wherein the agricultural machine is a tractor with a working implement mounted thereon or towed thereby, and the actuator controls the speed of the tractor and/or the rotational speed of a power takeoff shaft and/or the position of an adjustable coupling to which the working implement is fastened.

9. The agricultural machine according to claim 1, wherein the agricultural machine comprises a soil working machine, and the actuator controls the working depth of the soil working tools of the soil working machine.

10. The agricultural machine according to claim 1, wherein the agricultural machine comprises a sowing machine with sowing devices, and the actuator controls the sowing depth and/or the distances between the seeds in the forward direction and/or in the sideward direction.

11. The agricultural machine according to claim 1, wherein the agricultural machine comprises a spreading machine for discharging materials such as seeds, fertilizer, herbicides or pesticides, and the actuator controls the discharge quantity per unit area.

12. The agricultural machine according to claim 1, wherein the agricultural machine is a combine harvester and the actuator controls the cut height and/or the reel height of a front-mounted harvesting attachment and/or the rotational speed of a cleaning fan and/or the opening size of a cleaning screen and/or the advancing speed of the combine harvester.

13. A method for automatic setting of a working parameter of an agricultural machine, comprising:
- adjusting at least one working parameter of an agricultural machine by an electronic control device which controls an actuator which is actuated under external power;
- detecting at least one of a vertical position of the agricultural machine, the inclination of the agricultural machine in a forward or sideward direction, and a distance between the agricultural machine and an object, by a sensor coupled to the control device; and
- deriving from the signals of the sensor which topographical zone of a number of topographical zones of a field the agricultural machine is situated in, and activating the actuator as a function of the respective topographical zone.

* * * * *